United States Patent
Wu et al.

(10) Patent No.: US 12,250,731 B2
(45) Date of Patent: Mar. 11, 2025

(54) CONTENTION RESOLUTION IN RANDOM ACCESS PROCEDURE

(71) Applicant: NOKIA TECHNOLOGIES OY, Espoo (FI)

(72) Inventors: Chunli Wu, Beijing (CN); Samuli Turtinen, Ii (FI); Benoist Sebire, Tokyo (JP)

(73) Assignee: NOKIA TECHNOLOGIES OY, Espoo (FI)

( * ) Notice: Subject to any disclaimer, the term of this patent is extended or adjusted under 35 U.S.C. 154(b) by 749 days.

(21) Appl. No.: 17/431,674

(22) PCT Filed: Feb. 22, 2019

(86) PCT No.: PCT/CN2019/075807
§ 371 (c)(1),
(2) Date: Aug. 17, 2021

(87) PCT Pub. No.: WO2020/168532
PCT Pub. Date: Aug. 27, 2020

(65) Prior Publication Data
US 2022/0124830 A1   Apr. 21, 2022

(51) Int. Cl.
*H04W 74/0833* (2024.01)
*H04W 72/1263* (2023.01)
(Continued)

(52) U.S. Cl.
CPC ... *H04W 74/0841* (2013.01); *H04W 72/1263* (2013.01); *H04W 72/23* (2023.01); *H04W 74/002* (2013.01)

(58) Field of Classification Search
None
See application file for complete search history.

(56) References Cited

U.S. PATENT DOCUMENTS

| 9,306,713 | B2 | 4/2016 | Malladi et al. |
| 10,708,953 | B2 * | 7/2020 | Islam ............. H04W 72/12 |

(Continued)

FOREIGN PATENT DOCUMENTS

| CN | 107872899 A | 4/2018 |
| CN | 108632987 A | 10/2018 |
| WO | 2019/088670 A1 | 5/2019 |

OTHER PUBLICATIONS

Extended Search Report dated Jul. 25, 2022, corresponding to European Patent Application No. 19916442.7.
(Continued)

*Primary Examiner* — Mariela Vidal Carpio
(74) *Attorney, Agent, or Firm* — SQUIRE PATTON BOGGS (US) LLP

(57) ABSTRACT

Embodiments of the disclosure provide a method, device and computer readable medium for contention resolution in RACH. According to embodiments of the present disclosure, the terminal devices transmit random access requests in random access channels and the network device transmits the response to the random access requests on the downlink control channel addressed to the common identifier. According to embodiments of the present disclosure, there is one to multiple mapping for contention resolution radio network temporary identifier (CR-RNTI) and physical RACH (PRACH). In this way, the number of RNTIs is decreased and the overhead is reduced.

15 Claims, 8 Drawing Sheets

(51) Int. Cl.
*H04W 72/23* (2023.01)
*H04W 74/00* (2009.01)

(56) References Cited

U.S. PATENT DOCUMENTS

| | | | | |
|---|---|---|---|---|
| 11,336,329 | B2* | 5/2022 | Liu | H04L 5/0044 |
| 11,895,598 | B2* | 2/2024 | Jeon | H04W 52/365 |
| 11,956,776 | B2* | 4/2024 | Liu | H04L 27/2602 |
| 2013/0272241 | A1* | 10/2013 | Ohta | H04W 74/006 370/329 |
| 2013/0322339 | A1* | 12/2013 | Ohta | H04W 74/0833 370/328 |
| 2016/0309516 | A1* | 10/2016 | Wong | H04W 74/0833 |
| 2019/0069258 | A1* | 2/2019 | Jeon | H04W 56/0045 |
| 2019/0132882 | A1* | 5/2019 | Li | H04L 27/2605 |
| 2019/0306890 | A1* | 10/2019 | Jang | H04W 72/535 |
| 2019/0327764 | A1* | 10/2019 | Yoo | H04L 1/18 |
| 2019/0335512 | A1* | 10/2019 | Shi | H04W 80/02 |
| 2019/0350000 | A1* | 11/2019 | Zhang | H04W 72/20 |
| 2019/0350004 | A1* | 11/2019 | Zhao | H04W 74/0836 |
| 2020/0107372 | A1* | 4/2020 | Agiwal | H04W 72/23 |
| 2020/0154488 | A1* | 5/2020 | Zhang | H04W 74/0808 |
| 2020/0260498 | A1* | 8/2020 | Xu | H04W 74/0833 |
| 2020/0260500 | A1* | 8/2020 | Agiwal | H04W 74/006 |
| 2020/0314919 | A1* | 10/2020 | Zhang | H04W 72/046 |
| 2021/0105813 | A1* | 4/2021 | Lee | H04W 74/0833 |
| 2021/0144771 | A1* | 5/2021 | Shi | H04W 74/0833 |
| 2021/0160858 | A1* | 5/2021 | Wu | H04W 74/0833 |
| 2021/0315053 | A1* | 10/2021 | Kim | H04W 88/14 |
| 2021/0329703 | A1* | 10/2021 | Yang | H04B 17/318 |
| 2021/0377825 | A1* | 12/2021 | Deenoo | H04W 36/322 |
| 2021/0378021 | A1* | 12/2021 | You | H04W 74/002 |
| 2021/0378023 | A1* | 12/2021 | Xu | H04W 74/006 |
| 2021/0392700 | A1* | 12/2021 | Ohseki | H04W 72/044 |
| 2021/0410191 | A1* | 12/2021 | Wu | H04W 74/0833 |
| 2022/0078763 | A1* | 3/2022 | Cai | H04W 52/0216 |
| 2022/0110165 | A1* | 4/2022 | Uchino | H04W 74/0866 |
| 2022/0124828 | A1* | 4/2022 | Uchino | H04W 74/0841 |
| 2022/0190906 | A1* | 6/2022 | Haghighat | H04W 24/08 |

OTHER PUBLICATIONS

Intel Corporation: "Further consideration of 2-step Cbra", 3GPP Draft; R2-1816697-2STEPRA-NRU_V00, 3rd Generation Partnership Project (3GPP), Mobile Competence Centre ; 650, Route Des Lucioles ; F-06921 Sophia-Antipolis Cedex ; FRANCE vol. RAN WG2, No. Spokane, USA; Nov. 12, 2018-Nov. 16, 2018 Nov. 12, 2018 (Nov. 12, 2018).

Intel Corporation: "2-Step random access procedure in NR", 3GPP Draft; R2-168520_5G_2-STEP Ra_VOO, 3rd Generation Partnership Project (3GPP), Mobile Competence Centre ; 650, Route Des Lucioles ; F-06921 Sophia-Antipolis Cedex ; FRANCE vol. RAN WG2, No. Reno, Nevada, USA; Nov. 14, 2016-Nov. 18, 2016 Nov. 13, 2016 (Nov. 13, 2016).

VIVO: "RAN2 impacts of 2-step RACH", 3GPP Draft; R2-1818260 RAN2 Impacts of 2-STEP RACH, 3rd Generation Partnership Project (3GPP), Mobile Competence Centre ; 650, Route Des Lucioles ; F-06921 Sophia-Antipolis Cedex ; FRANCE vol. RAN WG2, No. Spokane, USA; Nov. 12, 2018-Nov. 16, 2018 Nov. 12, 2018 (Nov. 12, 2018).

Mediatek Inc: "Further considerations on 2-step RACH", 3GPP Draft; R2-1813965 Further Considerations On 2-STEP RACH, 3rd Generation Partnership Project (3GPP), Mobile Competence Centre; 650, Route Des Lucioles; F-06921 Sophia-Antipolis Cedex; FRANCE vol. RAN WG2 Sep. 27, 2018 (Sep. 27, 2018), pp. 1-7.

ZTE et al: "Considerations on 2-Step RACH Procedures", 3GPP Draft; R1-1901627, 3rd Generation Partnership Project (3GPP), Mobile Competence Centre ; 650, Route Des Lucioles ; F-06921 Sophia-Antipolis Cedex ; FRANCE, Feb. 16, 2019 (Feb. 16, 2019), pp. 1-11.

ZTE Corporation et al: "Msg2 payload contents for 2-step RACH", 3GPP Draft; R2-1817064_R2, 3rd Generation Partnership Project (3GPP), Mobile Competence Centre ; 650, Route Des Lucioles ; F-06921 Sophia-Antipolis Cedex ; FRANCE, Nov. 2, 2018 (Nov. 2, 2018), pp. 1-9.

Office Action and Search Report dated Dec. 15, 2023, corresponding to Chinese Patent Application No. 201980091877.7.

International Search Report and Written Opinion dated Nov. 13, 2019, corresponding to International Patent Application No. PCT/CN2019/075807.

Qualcomm Incorporated, "Revised SID on NR-based Access to Unlicensed Spectrum", 3GPP TSG RAN Meeting #80, La Jolla, USA, Jun. 11-14, 2018, RP-181339, 5 pages.

OPPO, "3-steps RACH procedure for NR-U", 3GPP TSG-RAN WG2 Meeting #104, Spkane, USA, Nov. 12-16, 2018, R2-1816262, 3 pages.

ZTE, "Revision of Study on 5G Non-orthogonal Multiple Access", 3GPP TSG RAN Meeting #80, La Jolla, USA, Jun. 11-14, 2018, RP-181403, 5 pages.

ZTE Corporation, Sanechips, "New work item: 2-step RACH for NR", 3GPP TSG RAN Meeting #82, Sorrento, Italy, Dec. 10-13, 2018, RP-182894, 5 pages.

3GPP TS 38.321 V15.4.0 (Dec. 2018), 3rd Generation Partnership Project; Technical Specification Group Radio Access Network; NR; Medium Access Control (MAC) protocol specification; (Release 15), 77 pages.

3GPP TS 38.889 V16.0.0 (Dec. 2018), 3rd Generation Partnership Project; Technical Specification Group Radio Access Network; Study on NR-based access to unlicensed spectrum, (Release 16), 119 pages.

Chinese Office Action with English language translation, corresponding to CN Application No. 201980091877.7, dated Jun. 7, 2024.

European Communication pursuant to Article 94(3) EPC, corresponding to EP Application No. 19 916 442.7, dated Dec. 12, 2024.

* cited by examiner

CONTENTION RESOLUTION IN RANDOM ACCESS PROCEDURE

FIELD

Embodiments of the present disclosure generally relate to communication techniques, and more particularly, to methods, devices and computer readable medium for contention resolution in a random access procedure.

BACKGROUND

In recent communication networks, a random access channel (RACH) is shared by terminal devices to request access to networks for call set-up and burst data transmission. Since the RACH is shared, it is possible that two or more terminal devices transmit at the same time and their transmissions collide. This is known as contention. If the terminal device does not get response, it performs the random access request again. Such transmission collisions may incur undesirable failure of random access and unexpected delay in transmission.

SUMMARY

Generally, embodiments of the present disclosure relate to a method for contention resolution in a random access procedure and the corresponding communication devices.

In a first aspect, embodiments of the disclosure provide a terminal device. The terminal device comprises: at least on processor; and a memory coupled to the at least one processor, the memory storing instructions therein, the instructions, when executed by the at least one processor, causing the terminal device to: transmit, at the terminal device, a random access request to a network device. The random access request comprising at least one preamble for a random access procedure and identity information of the terminal device. The terminal device is also caused to receive, from the network device, a random access response to the random access request scheduled by a downlink control channel scrambled with an identifier. The one or more terminal devices transmit preambles for random access procedures to the network device on random access channels. The identifier is used for scrambling downlink control channels associated with the terminal devices. The terminal device is further caused to in response to determining that the random access response comprising the identity information of the terminal device, determine that the random access procedure of the terminal device is successful.

In a second aspect, embodiments of the disclosure provide a network device. The network device comprises: at least on processor; and a memory coupled to the at least one processor, the memory storing instructions therein, the instructions, when executed by the at least one processor, causing the network device to: receive, at the network device, random access requests from one or more terminal devices. The random access requests comprise at least preambles for random access procedures of the terminal devices and identity information of the terminal devices. The preambles are transmitted on random access channels. The network device is also caused to transmit a random access response to the terminal devices on a downlink control channel scrambled with an identifier. The random access response comprises identity information of at least one of the terminal device to indicate that the random access procedure of the at least one of the one or more terminal device sis successful. The identifier is used for scrambling downlink control channels associated with the terminal devices.

In a third aspect, embodiments of the present disclosure provide a method. The method comprises: transmitting, at a terminal device, a random access request to a network device. The random access request comprises at least one preamble for a random access procedure and identity information of the terminal device. The method also comprises receiving, from the network device, a random access response to the random access request scheduled by a downlink control channel scrambled with an identifier. The random access response comprises identity information of at least one of terminal devices. The terminal devices transmit preambles for random access procedures to the network device on random access channels. The identifier is used for scrambling downlink control channels associated with the terminal devices. The method further comprises in response to determining that the random access response comprising the identity information of the terminal device, determining that the random access procedure of the terminal device is successful.

In a fourth aspect, embodiments of the present disclosure provide a method. The method comprises: receiving, at a network device, random access requests from one or more terminal devices. The random access requests comprise at least preambles for random access procedures of the terminal devices and identity information of the terminal devices. The preambles are transmitted on random access channels. The method further comprises transmitting a random access response to the terminal devices on a downlink control channel scrambled with an identifier. The random access response comprises identity information of the at least one of the terminal devices to indicate that the random access procedure of the at least one of the terminal devices is successful. The identifier is used for scrambling downlink control channels associated with the terminal devices.

In a fifth aspect, embodiments of the disclosure provide an apparatus. The apparatus comprises means for transmitting, at a terminal device, a random access request to a network device. The random access request comprises at least one preamble for a random access procedure and identity information of the terminal device. The apparatus also comprises means for receiving, from the network device, a random access response to the random access request scheduled by a downlink control channel scrambled with an identifier. The random access response comprises identity information of one or more terminal devices. The terminal devices transmit preambles for random access procedures to the network device on random access channels. The identifier is used for scrambling downlink control channels associated with the terminal devices. The apparatus further comprises means for in response to determining that the random access response comprising the identity information of the terminal device, determining that the random access procedure of the terminal device is successful.

In a sixth aspect, embodiments of the disclosure provide an apparatus. The apparatus comprises means for receiving, at a network device, random access requests from one or more terminal devices. The random access requests comprise at least preambles for random access procedures of the terminal devices and identity information of the terminal devices. The preambles are transmitted on random access channels. The apparatus also comprises means for transmitting a random access response to the one or more terminal devices on a downlink control channel scrambled with an identifier. The random access response comprises identity information of the at least one of the terminal devices to indicate that the random access procedure of the at least one of the terminal devices is successful. The identifier is used for scrambling downlink control channels associated with the terminal devices.

In a seventh aspect, embodiments of the disclosure provide a computer readable medium. The computer readable medium stores instructions thereon, the instructions, when executed by at least one processing unit of a machine, causing the machine to implement the method according to the third aspect or the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the figures, same or similar reference numbers indicate same or similar elements.

DETAILED DESCRIPTION OF EMBODIMENTS

Figure 1:
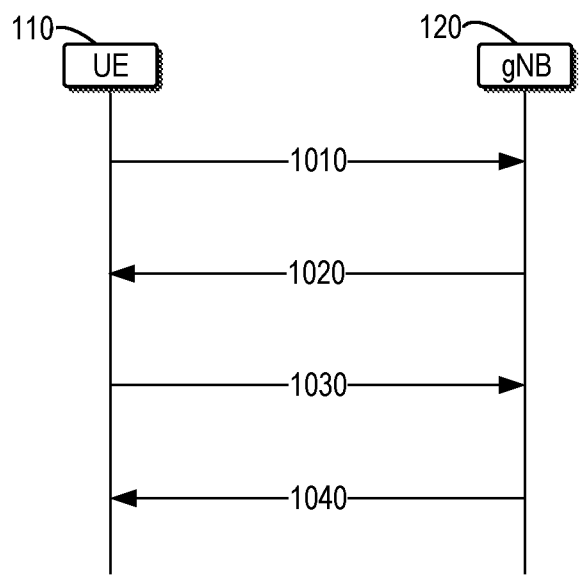
FIG. 1 illustrates a schematic diagram of a procedure of a conventional four-step RACH.

The subject matter described herein will now be discussed with reference to several example embodiments. It should be understood these embodiments are discussed only for the purpose of enabling those skilled persons in the art to better understand and thus implement the subject matter described herein, rather than suggesting any limitations on the scope of the subject matter.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two functions or acts shown in succession may in fact be executed concurrently or may sometimes be executed in the reverse order, depending upon the functionality/acts involved.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system. For the purpose of illustrations, embodiments of the present disclosure will be described with reference to 5G communication system.

The term "network device" used herein includes, but not limited to, a base station (BS), a gateway, a registration management entity, and other suitable device in a communication system. The term "base station" or "BS" represents a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth.

The term "terminal device" used herein includes, but not limited to, "user equipment (UE)" and other suitable end device capable of communicating with the network device. By way of example, the "terminal device" may refer to a terminal, a Mobile Terminal (MT), a Subscriber Station (SS), a Portable Subscriber Station, a Mobile Station (MS), or an Access Terminal (AT).

The term "circuitry" used herein may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As mentioned above, several mechanisms for RACH have been proposed. For example, four-step RACH procedure has been proposed. As shown in FIG. 1, for four-step RACH procedure, a RACH transmission occasion is defined as the time-frequency resource on which a PRACH message 1 is transmitted using the configured PRACH preamble format. The user equipment (UE) 110 may transmit 1010 the RACH preamble on a PRACH resource which is mapped to a RA-RNTI and the network device may decode the preamble and obtain the RA-RNTI depending on the PRACH resource where the preamble is received. The gNB 120 may transmit 1020 message 2 which may indicate the transmission resource of message 3. In particular, the gNB 120 may transmit RA response scheduled with PDCCH addressed the RA-RNTI which is calculated from the PRACH resource (for example, time and/or frequency allocation). The UE 110 may decode the RA response and obtain the transmission resource for message3. The UE 110 may transmit 1030 a radio resource control (RRC) connection request as message3 scrambled by T-CRNTI obtained from the RA response (message2). The gNB 120 may response 1040 a contention resolution ID (containing the UL CCCH SDU in msg3) in message4 scrambled by T-CRNTI obtained from the RA response (message2) and T-CRNTI is considered as C-RNTI by the UE upon reception of the message 4.

Figure 2:
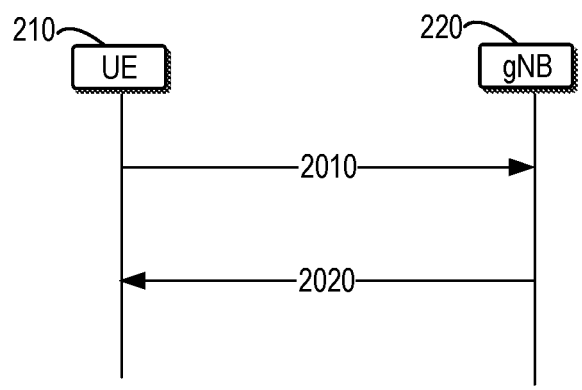
FIG. 2 illustrates a schematic diagram of a procedure of a conventional two-step RACH.

In recent studies, two-step RACH has also been proposed, which is shown in FIG. 2. The UE 210 transmits 2010 messageA to the gNB 220 and the gNB 220 transmits 2020 messageB to the UE 210. Compared to the traditional four-step RACH with preamble, RAR, message3 and contention resolution message, two-step RACH combines the transmission of preamble and the message3 payload into messageA, and combines RAR and contention resolution message into messageB. For two-step RACH, the messageA is a signal to detect the UE while the second message is for contention resolution for CBRA with a possible payload. The messageA will at least include the equivalent information which is transmitted in message3 for four-step RACH.

As a baseline, all the triggers for four-step RACH are also applicable to two-step RACH; however further analysis is needed on SI request and BFR as well as how timing advance and grants can be obtained for messageA.

The contention resolution in two-step RACH will be performed by including a UE identifier in the first message (i.e. messageA) which is echoed in the second message (i.e. messageB). Fall-back from two-step RACH to four-step RACH will be supported. The fallback after messageA transmission is feasible only if detection of the UE without the decoding of the payload is possible and thus relies on such support at the physical layer. If two-step RACH is used for initial access, the parameters for two-step RACH procedure including resources for messageA will be broadcasted. The network can configure different PRACH resources or different preambles for four-step RACH and two-step RACH.

For contention resolution and design of RNTI for two-step RACH, studies have been made to reuse what has already been defined for the traditional four-step RACH.

The RA-RNTI associated with the PRACH in which the Random Access Preamble is transmitted, is computed uniquely as:

$$RA\text{-}RNTI = 1 + s\_id + 14 \times t\_id + 14 \times 80 \times f\_id + 14 \times 80 \times 8 \times ul\_carrier\_id \quad (1)$$

where s_id is the index of the first OFDM symbol of the specified PRACH (0 ≤ s_id<14), t_id is the index of the first slot of the specified PRACH in a system frame (0 ≤ t_id<80), f_id is the index of the specified PRACH in the frequency domain (0 ≤ f_id<8), and ul_carrier_id is the UL carrier used for Message1 transmission (0 for NUL carrier, and 1 for SUL carrier). In other words, there is a one-to-one relationship between the RA-RNTI and the PRACH occasion used to transmit the Random Access Preamble.

It has been discussed that the RAR window (currently maximum 10 ms) needs to be extended to cope with potential LBT failure, which means the RA-RNTI range will also need to be extended. Similarly, the window for messageB reception will most likely be longer than current RAR window as well. Current RA-RNTI space is already over 19 k values, it is undesirable to extend the RA-RNTI further to keep overhead under control.

Contention resolution for four-step RACH is addressed to either Temporary C-RNTI or C-RNTI depending on whether the UE already has C-RNTI allocated and included C-RNTI MAC CE in the message3. Both cannot be used for two-step RACH. C-RNTI is not applicable to two-step RACH from IDLE mode initial when the UE does not have C-RNTI allocated yet. Temporary C-RNTI is allocated in message2 of the four-step RACH hence not applicable to two-step RACH.

According to embodiments of the present disclosure, the terminal devices transmit random access requests and the network device transmits one response to the random access requests which comprises the identity information of terminal devices which succeed in the RACH. According to embodiments of the present disclosure, the terminal devices transmit random access requests in random access channels and the network device transmits the response to the random access requests on the downlink control channel addressed to the common identifier. According to embodiments of the present disclosure, there is one to multiple mapping for contention resolution radio network temporary identifier (CR-RNTI) and physical RACH (PRACH). In this way, the number of RNTIs is decreased and the overhead is reduced.

Figure 3:
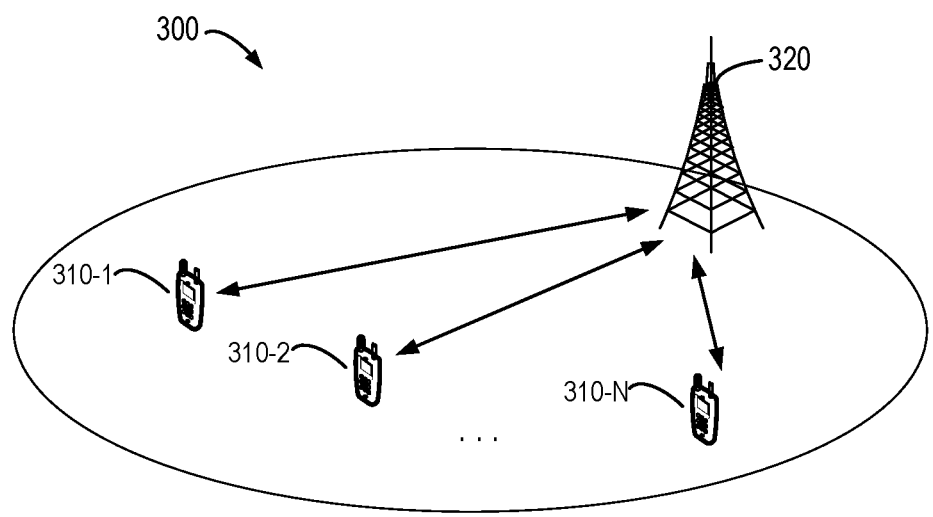
FIG. 3 illustrates a schematic diagram of a communication system according to embodiments of the present disclosure.

FIG. 3 illustrates a schematic diagram of a communication system 300 in which embodiments of the present disclosure can be implemented. The communication system 300, which is a part of a communication network, comprises terminal devices 310-1, 310-2, . . . , 310-N (collectively referred to as "terminal device(s) 310" where N is an integer number). The communication system 300 comprises one or more network devices, for example, a network device 320. It should be understood that the communication system 300 may also comprise other elements which are omitted for the purpose of clarity. It is to be understood that the numbers of terminal devices and network devices shown in FIG. 3 are given for the purpose of illustration without suggesting any limitations. The network device 320 may communicate with the terminal devices 310.

Communications in the communication system 300 may be implemented according to any proper communication protocol(s), including, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, including but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 4:
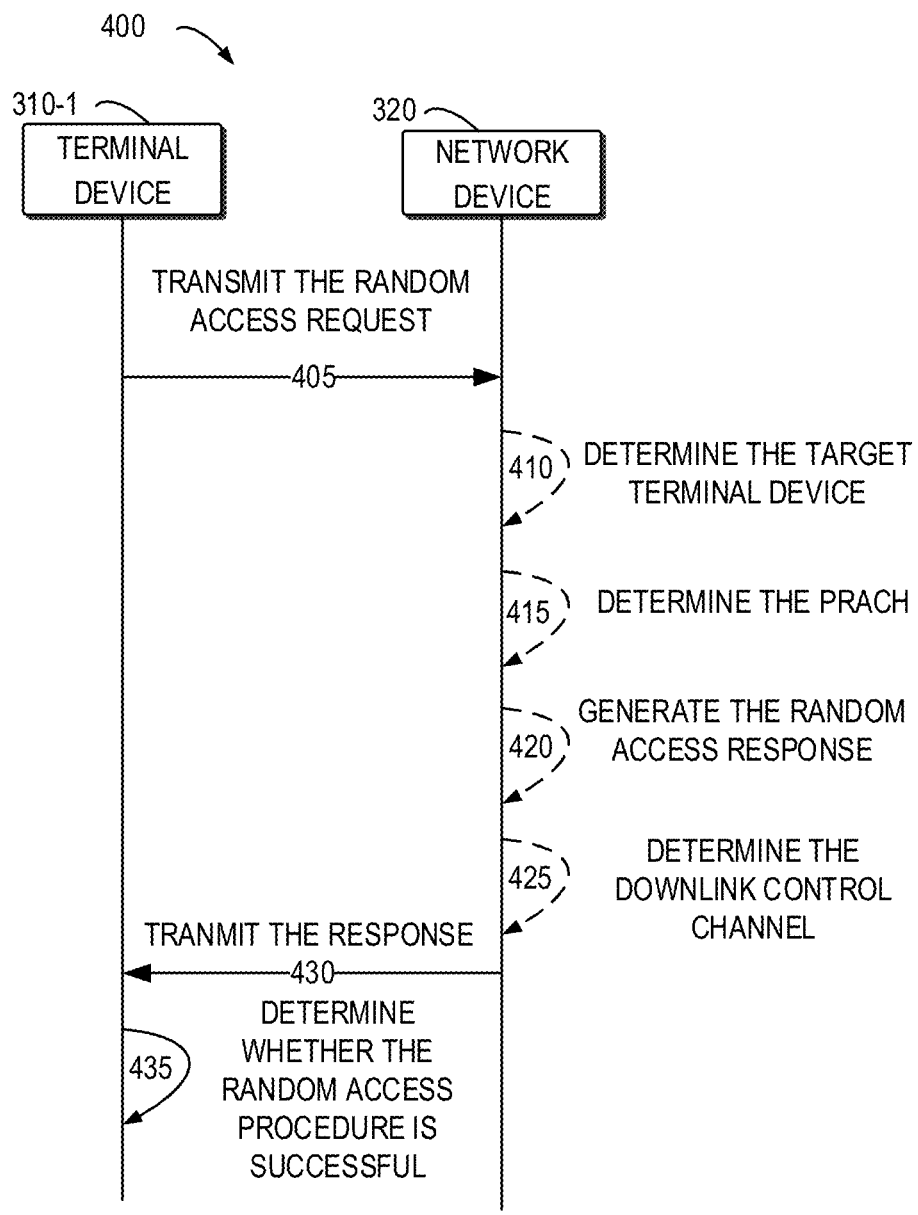
FIG. 4 illustrates a schematic diagram of interactions among devices according to embodiments of the present disclosure.

FIG. 4 illustrates a schematic diagram of interactions 400 in accordance with embodiments of the present disclosure. The interactions 400 may be implemented at any suitable devices. Only for the purpose of illustrations, the interactions 400 are described to be implemented at the terminal device 310-1 and the network device 320.

The terminal device 310-1 transmits 405 one or more random access request (also referred to as "message A") to the network device 320. The random access request comprises a preamble for random access procedure. The preamble is transmitted on a random access channel, for example, physical random access channel (PRACH). In some embodiments, the terminal device 310-1 may determine the PRACH and preamble based on predetermined configurations. For example, the terminal device 310-1 may be configured with information indicating PRACHs and/or preambles used for two-step RACH.

In addition, the random access request comprises identity information of the terminal device 310-1. The identity information may be transmitted on a physical uplink shared channel (PUSCH). In some embodiments, if the terminal device 310-1 is in an idle mode and/or inactive mode, the identity information may be a common control channel (CCCH) message which contains UE ID, e.g. RRC Setup Request message for idle mode UE or RRC Resume Request for inactive mode UE. In other embodiments, if the terminal device 310-1 has a cell radio network temporary identifier (C-RNTI), for example, the terminal device 310-1 may be in a connected mode, the identity information may be the C-RNTI. The request may comprise C-RNTI medium access control (MAC) control element (CE).

Alternatively or in addition, the random access request may also comprise a buffer report (BSR) and/or power headroom report (PHR). The random access request may further comprise other proper data depending on the size of the request.

The network device 320 receives the random access requests from one or more terminal devices 310, for example, the terminal devices 310-1 and/or 310-2. The network device 320 determines 410 at least one terminal device (referred to as "the target terminal device") from the one or more terminal devices 310. The target terminal device is successful in random access procedure. The random access requests may be from one terminal device. Alternatively, the random access requests may be from different terminal devices.

In some embodiments, the network device 320 may determine 415 the random access channels on which the random access request are received. In some embodiments, the preambles may be transmitted on different random access channels. In other embodiments, the preambles may be transmitted on a same random access channel.

In some embodiments, the network device 320 may be configured with information indicating a set of predetermined PRACHs used for two-step RACH. If the PRACHs belong to the set of predetermined PRACHs, the network device 320 may determine that the random access requests are used for two-step RACH.

Alternatively or in addition, the network device 320 may be configured with information indicating a set of predetermined preambles used for two-step RACH. If the preambles belong to the set of predetermined preambles, the network device 320 may determine that the random access requests are used for two-step RACH.

The network device 320 may generate 420 the random access response (messageB). The random access response comprises the identity information of the target terminal device. If the identity information carried in the random access request is the CCCH UE ID of the target terminal device, the network device 320 generates the random access response indicating the CCCH UE ID. For example, the random access response may comprise the CCCH MAC CE as contention resolution. Alternatively or in addition, the random access response may comprise C-RNTI field to allocate C-RNTI to target the terminal device.

In other embodiments, if the identity information carried in the random access request is the C-RNTI of the target terminal device, the network device 320 generates the random access response indicating the C-RNTI MAC CE in the message if it is not scheduled with PDCCH addressed to C-RNTI. For example, the random access response may comprise the C-RNTI MAC CE as contention resolution. Alternatively, the random access response may be scheduled with PDCCH addressed to C-RNTI without indicating the C-RNTI MAC CE in the message.

The identifier may be common to requests received on different random access channels. Alternatively, the identifier may also be common to all requests received on the random access channels. In an example embodiment, one common specific RNTI, contention resolution RNTI (CR-RNTI) may be configured for transmitting the random access responses, instead of linking the response to the PRACH occasion where the preamble for random access request is sent.

In another embodiment, finer granularity than only one common specific RNTI may be defined for CR-RNTI. In this way, it reduces decoding efforts for the terminal devices which are not responded by the network device 320. For example one RNTI for each subframe/slot within a radio frame. The CR-RNTI may be preconfigured to the network device 320 and the terminal devices 310 or fixed in the specification.

The network device 320 may determine 425 a physical downlink control channel for transmitting the random access response. The downlink control channel is scrambled with an identifier.

In some embodiments, the downlink control channel is scrambled with the CR-RNTI. In other embodiments, if the network device 320 knows the C-RNTI of the terminal device 310-1, the downlink control channel is scrambled with the C-RNTI. In this way, the number of RNTIs may be reduced, thus saving RNTI space used for RA procedure.

The network device 320 transmits 430 the random access response (also referred to as "message B") to the terminal device 310-1. In some embodiments, the terminal device 310-1 may determine the CR-RNTI and receive the random access response on the PDCCH addressed to the CR-RNTI.

For example, the terminal device 310-1 may monitor the PDCCH addressed to CR-RNTI during a configured window time (for example, the contention resolution window). Alternatively, the terminal device 310-1 may determine the C-RNTI and receive the random access response on the PDCCH associated with the C-RNTI. For example, the terminal device 310-1 may monitor the PDCCH addressed to C-RNTI during the configured window time.

The terminal device 310-1 determines 435 whether the random access procedure is successful. For example, if the terminal device 310-1 determines that the random access response comprises the identity information of the terminal device 310-1, the terminal device 310-1 may determine that the random access procedure of the terminal device 310-1 is successful.

In some embodiments, if the terminal device 310-1 determines that the random access response does not comprise the identity information of the terminal device 310-1, the terminal device 310-1 may determine that this attempt of the random access procedure of the terminal device 310-1 is not successful.

In this way, a limited number of RNTIs is needed for the random access scheduling instead of tens of thousands of RNTIs. In addition, the overhead of the random access response is reduced.

In some embodiments, the terminal device 310-1 may monitor the downlink control channel until the timer for the random access response expires. In some embodiments, the terminal device 310-1 may stop monitoring the random access response before the expire of the timer, if the random access response comprising a further indication indicating there is no further random access response to the random access request.

In addition, in some embodiments, the random access response may comprise an indication indicating that a further random access response to the random access request, the terminal device 310-1 may monitor the further random access response within the window. The further random response may be for a particular PRACH resource, for example, PRACH occasion, preamble, slot/subframe number. In this way, the terminal device 310-1 does not have to wait and can immediately transmit a further random access request.

Figure 5:
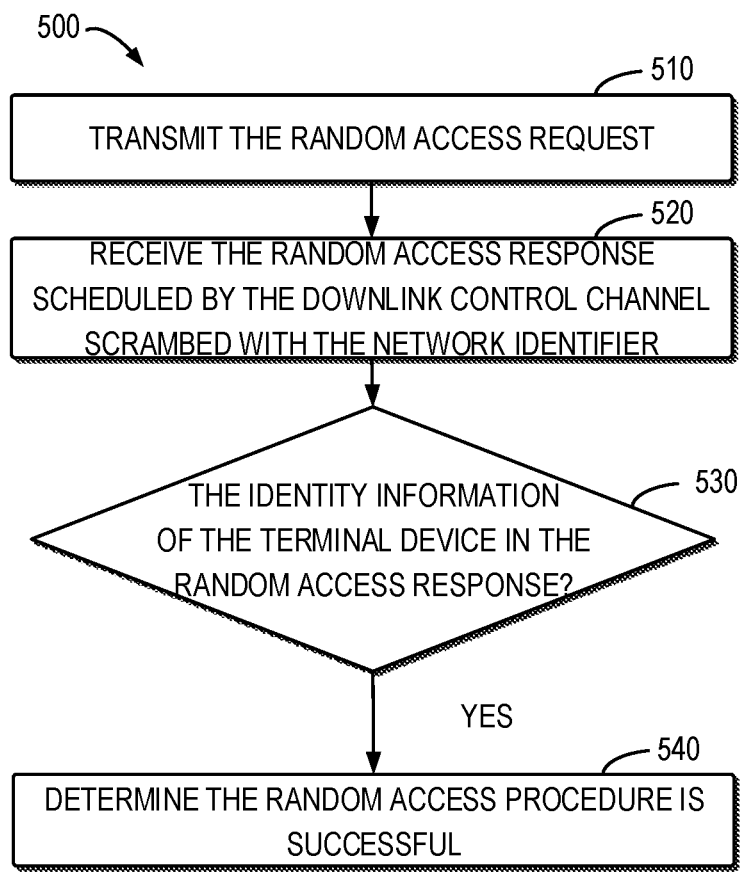
FIG. 5 illustrates a flow chart of a method implemented at a communication device according to embodiments of the present disclosure.

FIG. 5 illustrates a flow chart of a method 500 in accordance with embodiments of the present disclosure. The method 500 may be implemented at any suitable devices. Only for the purpose of illustrations, the method 500 is described to be implemented at the terminal device 310-1.

At block 510, the terminal device 310-1 transmits the random access request to the network device 320. The random access request comprises at least one preamble for random access procedure. The preamble may be transmitted on a random access channel, for example, PRACH. In some embodiments, the terminal device 310-1 may determine the random access channel based on predetermined configurations. For example, the terminal device 310-1 may be configured with information indicating PRACHs used for two-step RACH.

In addition, the random access request comprises identity information of the terminal device 310-1. The identity information may be transmitted on a physical uplink shared channel (PUSCH). In some embodiments, if the terminal device 310-1 is in an idle mode and/or inactive mode, the identity information may be a common control channel (CCCH) UE ID. In other embodiments, if the terminal device 310-1 has a cell radio network temporary identifier (C-RNTI), for example, the terminal device 310-1 may be in a connected mode, the identity information may be the C-RNTI. The request may comprise C-RNTI medium access control (MAC) control element (CE).

Alternatively or in addition, the random access request may also comprise a buffer report (BSR) and/or power headroom report (PHR). The random access request may further comprise other proper data depending on the size of the request.

At block 520, the terminal device 310-1 receives the random access response scheduled by a downlink control channel scrambled with the identifier from the network device 320. The random access response comprises the identity information of the at least one of the one or more terminal devices which succeed in the random access procedure. The one or more terminal devices transmit preambles to the network device 320. The identifier being used for scrambling downlink control channels associated with the one or more terminal devices.

In some embodiments, the terminal device 310-1 may determine the CR-RNTI and receive the random access response on the PDCCH addressed to the CR-RNTI. For example, the terminal device 310-1 may monitor the PDCCH addressed to CR-RNTI during a configured window time (for example, the contention resolution window). Alternatively, the terminal device 310-1 may determine the C-RNTI and receive the random access response on the PDCCH addressed to the C-RNTI. For example, the terminal device 310-1 may monitor the PDCCH addressed to C-RNTI during the configured window time.

If the identity information carried in the random access request is the CCCH UE ID of the target terminal device, the random access response may indicate the CCCH UE ID. For example, the random access response may comprise the CCCH MAC CE as contention resolution. Alternatively or in addition, the random access response may comprise C-RNTI MAC CE to allocate C-RNTI to target the terminal device.

In other embodiments, if the identity information carried in the random access request is the C-RNTI of the target terminal device, the random access response may indicate the C-RNTI. For example, the random access response may comprise the C-RNTI MAC CE as contention resolution.

At block 530, the terminal device 310-1 determines whether the identity information of the terminal device 310-1 is in the random access response in order to determine random access procedure of the terminal device 310-1 is successful. If the terminal device 310-1 determines that the random access response comprises the identity information of the terminal device 310-1, the terminal device 310-1 may determine, at block 540, that the random access procedure of the terminal device 310-1 is successful.

In some embodiments, the terminal device 310-1 may monitor the downlink control channel until the timer for the random access response expires. In some embodiments, the terminal device 310-1 may stop monitoring the random access response before the expire of the timer, if the random access response comprising a further indication indicating there is no further random access response to the random access request.

In some embodiments, if the terminal device 310-1 determines that the random access response does not comprise the identity information of the terminal device 310-1, the terminal device 310-1 may determine that the random access procedure of the terminal device 310-1 is not successful.

In some embodiments, an apparatus for performing the method 600 (for example, the terminal device 310-1) may comprise respective means for performing the corresponding steps in the method 500. These means may be implemented in any suitable manners. For example, it can be implemented by circuitry or software modules.

In some embodiments, the apparatus comprises means for transmitting, at a terminal device, a random access request to a network device, the random access request comprising at least one preamble for a random access procedure and identity information of the terminal device; means for receiving, from the network device, a random access response to the random access request scheduled by a downlink control channel scrambled with an identifier, the random access response comprising identity information of at least one of one or more terminal devices, the one or more terminal devices transmitting preambles for random access procedures to the network device on random access channels, the identifier being used for scrambling downlink control channels associated with the one or more terminal devices and means for in response to determining that the random access response comprising the identity information of the terminal device, determining that the random access procedure of the terminal device is successful.

In some embodiments, the identifier is common to a plurality of random access channels in the random access channels.

In some embodiments, the identifier is common to all of the random access channels.

In some embodiments, the mean for receiving the random access response comprises: means for determining the identifier to be a contention resolution radio network temporary identifier (CR-RNTI); and means for receiving the random access response on the downlink control channel addressed to the CR-RNTI.

In some embodiments, the means for receiving the random access response comprises: means for determining the identifier to be a cell radio network temporary identifier (C-RNTI); and means for receiving the random access response on the downlink control channel addressed to the C-RNTI.

In some embodiments, the means for transmitting the identity information comprises: means for in response to the terminal device being in an idle mode or an inactive mode, transmitting the identity information comprising a common control channel (CCCH) user equipment (UE) ID; or means for in response to the terminal device being in a connected mode, transmitting the identity information comprising a cell radio network temporary identifier (C-RNTI) medium access control (MAC) control element (CE).

In some embodiments, the random access request further comprises at least one of: a buffer status report (BSR), or a power headroom report.

In some embodiments, the apparatus further comprises at least one of: means for in response to determining that the random access response excluding the identity information of the terminal device, determine that the random access request of the terminal device is failed; and means for in response to the random access response comprising an indication indicating a further random access response to the random access request, monitor the further random access response.

In some embodiments, the random access response comprises at least one of: a CCH MAC CE, or a C-RNTI MAC CE.

In some embodiment, the apparatus further comprises: means for in response to the random access response comprising a further indication indicating there is no further random access response to the random access request, stopping monitoring the downlink control channel before an expire of a time for the random access response.

In some embodiment, the apparatus further comprises: means for monitoring the downlink control channel until an expiration of a time for the random access response.

Figure 6:
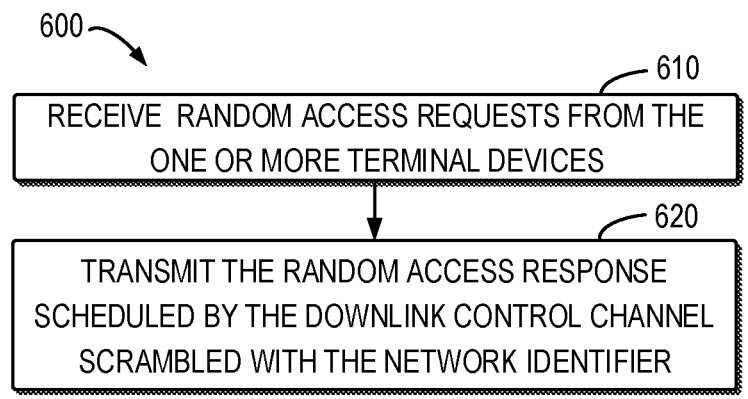
FIG. 6 illustrates a flow chart of a method implemented at a communication device according to embodiments of the present disclosure.

FIG. 6 illustrates a flow chart of a method 600 in accordance with embodiments of the present disclosure. The method 600 may be implemented at any suitable devices. Only for the purpose of illustrations, the method 600 is described to be implemented at the network device 120.

At block 610, the network device 320 receives random access requests from the one or more terminal devices 310-1. The random access requests comprise preambles for random access procedure of the one or more terminal devices. The preambles may be received on random access channels. In some embodiments, the preambles may be received on different random access channels. In other embodiments, the preambles may be received on the same random access channel.

In addition, the random access request comprises identity information of the terminal devices 310. The identity information may be received on a physical uplink shared channel (PUSCH). In some embodiments, if the terminal devices are in an idle mode and/or inactive mode, the identity information may be a common control channel (CCCH) UE ID. In other embodiments, if the terminal devices 310 have a cell radio network temporary identifier (C-RNTI), for example, the terminal device 310-1 may be in a connected mode, the identity information may be the C-RNTI. The request may comprise C-RNTI medium access control (MAC) control element (CE).

Alternatively or in addition, the random access request may also comprise a buffer report (BSR) and/or power headroom report (PHR). The random access request may further comprise other proper data depending on the size of the request.

In some embodiments, the network device 320 may determine the random accesses channels on which the random access request is received. In some embodiments, the network device 320 may be configured with information indicating a set of predetermined random accesses channels used for two-step RACH. If the random accesses channels belong to the set of predetermined random accesses channels, the network device 320 may determine that the random access requests are used for two-step RACH.

In some embodiments, the network device 320 may be configured with information indicating a set of predetermined preambles used for two-step RACH. If the preambles belong to the set of predetermined preambles, the network device 320 may determine that the random access requests are used for two-step RACH.

In some embodiments, the network device 320 may generate the random access response. The random access response comprises the identity information of the target terminal device. If the identity information carried in the random access request is the CCCH UE ID of the target terminal device, the network device 320 generates the random access response indicating the CCCH UE ID. For example, the random access response may comprise the CCCH MAC CE as contention resolution. Alternatively or in addition, the random access response may comprise C-RNTI filed to allocate C-RNTI to target the terminal device.

In other embodiments, if the identity information carried in the random access request is the C-RNTI of the target terminal device, the network device 320 generates the random access response indicating the C-RNTI. For example, the random access response may comprise the C-RNTI MAC CE as contention resolution if the random access is not scheduled by PDCCH addressed to C-RNTI, but with contention resolution RNTI.

In an example embodiment, one common specific RNTI, contention resolution RNTI (CR-RNTI) may be configured for transmitting the random access response, instead of linking the response to the PRACH occasion where the preamble for random access request is sent.

In another embodiment, finer granularity than only one common specific RNTI may be defined for CR-RNTI. In this way, it reduces access efforts for the terminal devices which are not responded by the network device 320. For example one RNTI for each subframe/slot within a radio frame. The CR-RNTI may be preconfigured to the network device 320 and the terminal devices 310.

The network device 320 may determine a physical downlink control channel (PDCCH) for transmitting the random access response. In some embodiments, the PDCCH is addressed to the CR-RNTI. In other embodiments, the PDCCH is addressed to the C-RNTI. In this way, the number of RNTIs may be reduced, thus saving space.

At block 620, the network device 320 transmits the random access response to the terminal device 310-1. The random access response is scheduled by the downlink control channel which is scrambled with the identifier. In some embodiments, the PDCCH may be scrambled with the CR-RNTI. Alternatively, the PDCCH may be scrambled with the C-RNTI. In some embodiments, the identifier is common to a plurality of random access channels in the random access channels. Alternatively, the identifier is common to all of the random access channels.

In some embodiments, an apparatus for performing the method 600 (for example, the network device 120) may comprise respective means for performing the corresponding steps in the method 600. These means may be implemented in any suitable manners. For example, it can be implemented by circuitry or software modules.

In some embodiments, the apparatus comprises: means for receiving, at a network device, random access requests from one or more terminal devices, the random access requests comprising preambles for random access procedures of the one or more the terminal devices and identity information of the one or more terminal devices, the preambles being transmitted on random access channels; and means for transmitting a random access response to the one or more terminal devices on a downlink control channel scrambled with an identifier, the random access response comprising identity information of the at least one of the one or more terminal devices to indicate that the random access procedure of the at least one of the one or more terminal devices is successful, the identifier being used for scrambling downlink control channels associated with the one or more terminal devices.

In some embodiments, the identity information of the plurality of terminal devices comprises at least one of: common control channel (CCCH) user equipment (UE) IDs of the plurality of terminal devices, or cell radio network temporary identifier (C-RNTI) medium access control (MAC) control elements (CEs) of the one or more of terminal devices.

In some embodiments, the random access request further comprises at least one of: a buffer status report (BSR), or power headroom report (PHR).

In some embodiments, the apparatus further comprises: means for determining whether a further random access response is needed; and means for in response to determining that the further random access response is needed, adding into the random access response an indication indicating the further random access response.

In some embodiments, the means for transmitting the random access response comprises: means for determining physical random access channels (PRACHs) on which the preambles are received; means for comparing the PRACHs with a set of predetermined PRACHs; means for in response to the PRACHs belong to the set of predetermined PRACHs, determining the downlink control channel addressed to the identifier; and means for transmitting the random access response on the downlink control channel.

In some embodiments, the means for transmitting the random access response comprises: means for comparing the preambles with a set of predetermined preambles; means for in response to the preambles belonging to the set of predetermined preambles, determining the downlink control channel addressed to the identifier; and means for transmitting the random access response on the downlink control channel.

In some embodiments, the means for transmitting the random access response comprises: means for in response to the identity information of the at least one of the terminal devices device being a common control channel (CCCH) user equipment (UE) ID, generating the random access response indicating the CCH ID of the at least one of the terminal devices device; or means for in response to the identity information of the at least one of the terminal devices device being a cell radio network temporary identifier (C-RNTI), generating the random access response indicating the C-RNTI of the at least one of the terminal devices device.

Figure 7:
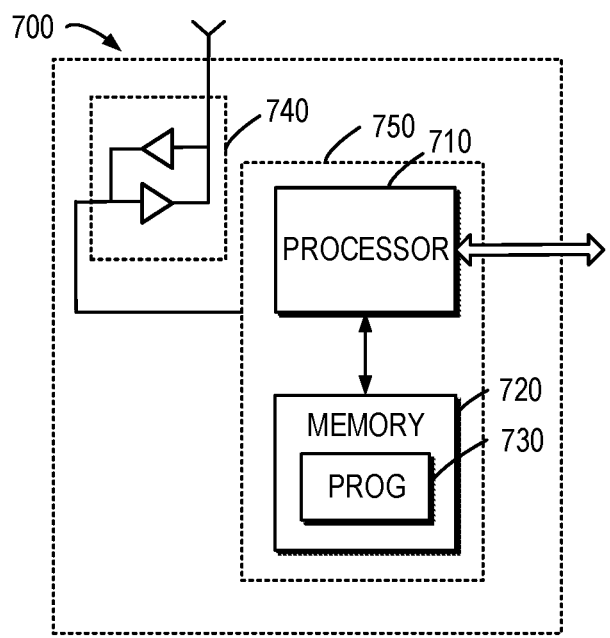
FIG. 7 illustrates a schematic diagram of a device according to embodiments of the present disclosure.

FIG. 7 is a simplified block diagram of a device 700 that is suitable for implementing embodiments of the present disclosure. The device 700 may be implemented at the network device 320. The device 700 may also be implemented at the terminal devices 310. As shown, the device 700 includes one or more processors 710, one or more memories 720 coupled to the processor(s) 710, one or more transmitters and/or receivers (TX/RX) 740 coupled to the processor 710.

The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

The memory 720 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples.

Figure 8:
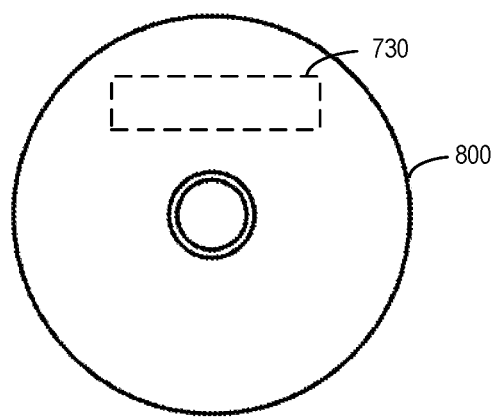
FIG. 8 shows a block diagram of an example computer readable medium in accordance with some embodiments of the present disclosure.

The memory 720 stores at least a part of a program 730. The device 700 may load the program 730 from the computer readable medium to the RAM for execution. The computer readable medium may include any types of tangible non-volatile storage, such as ROM, EPROM, a flash memory, a hard disk, CD, DVD, and the like. FIG. 8 shows an example of the computer readable medium 800 in form of CD or DVD. The computer readable medium has the program 730 stored thereon.

The TX/RX 740 is for bidirectional communications. The TX/RX 740 has at least one antenna to facilitate communication, though in practice an Access Node mentioned in this application may have several ones. The communication interface may represent any interface that is necessary for communication with other network elements.

The program 730 is assumed to include program instructions that, when executed by the associated processor 710, enable the device 700 to operate in accordance with the embodiments of the present disclosure, as discussed herein with reference to FIGS. 5 and 6. That is, embodiments of the present disclosure can be implemented by computer software executable by the processor 710 of the device 700, or by hardware, or by a combination of software and hardware.

While this specification contains many specific implementation details, these should not be construed as limitations on the scope of any disclosure or of what may be claimed, but rather as descriptions of features that may be specific to particular embodiments of particular disclosures. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Various modifications, adaptations to the foregoing exemplary embodiments of this disclosure may become apparent to those skilled in the relevant arts in view of the foregoing description, when read in conjunction with the accompanying drawings. Any and all modifications will still fall within the scope of the non-limiting and exemplary embodiments of this disclosure. Furthermore, other embodiments of the disclosures set forth herein will come to mind to one skilled in the art to which these embodiments of the disclosure pertain having the benefit of the teachings presented in the foregoing descriptions and the associated drawings.

Therefore, it is to be understood that the embodiments of the disclosure are not to be limited to the specific embodiments disclosed and that modifications and other embodiments are intended to be included within the scope of the appended claims. Although specific terms are used herein, they are used in a generic and descriptive sense only and not for purpose of limitation.

What is claimed is:

1. A terminal device, comprising:
   at least one processor; and
   a memory coupled to the at least one processor, the memory storing instructions therein, the instructions, when executed by the at least one processor, causing the terminal device to:
   transmit a random access request to a network device on a random access channel of a plurality of random access channels, the random access request comprising at least one preamble for a random access procedure and a cell radio network temporary identifier of the terminal device, wherein the cell radio network temporary identifier is common to the plurality of random access channels, wherein the plurality of random access channels are useable by one or more terminal devices to transmit preambles for random access procedures to the network device, and wherein the random access request comprises a message A (MsgA) of a two-step random access;
   receive, from the network device and during a configured time window, a random access response to the random access request on a downlink control channel addressed to the cell radio network temporary identifier;
   in response to the receiving, determine that the random access procedure of the terminal device is successful; and
   in response to the random access response comprising a further indication indicating there is no further random access response to the random access request, stop monitoring a further random access response before an expiry of the time window for the random access response.

2. The terminal device of claim 1, wherein the cell radio network temporary identifier is common to all of the random access channels.

3. The terminal device of claim 1, wherein the terminal device is caused to transmit the cell radio network temporary identifier by:
   in response to the terminal device being in a connected mode, transmitting the cell radio network temporary identifier.

4. The terminal device of claim 1, wherein the terminal device is further caused to:
   monitor the downlink control channel until expiration of a time for the random access response.

5. The terminal device of claim 1, wherein the random access response comprises
   a cell radio network temporary identifier medium access control control element.

6. A network device, comprising:
   at least one processor; and
   a memory coupled to the at least one processor, the memory storing instructions therein, the instructions, when executed by the at least one processor, causing the network device to:
   receive random access requests from one or more terminal devices on a random access channel of a plurality of random access channels, the random access requests comprising preambles for random access procedures of the one or more terminal devices and a cell radio network temporary identifier of the one or more terminal devices, the preambles being transmitted on random access channels, wherein the cell radio network temporary identifier is common to the plurality of random access channels, wherein the plurality of random access channels are useable by one or more terminal devices to transmit preambles for random access procedures to the network device, and wherein the random access request comprises a message A (MsgA) of a two-step random access; and transmit, during a configured time window, a random access response to the one or more terminal devices on a downlink control channel addressed to the cell radio network temporary identifier configured to indicate that the random access procedure of the at least one of the one or more terminal devices is successful, wherein the random access response comprises a further indication indicating there is no further random access response to the random access request configured to cause the one or more terminal devices to stop monitoring a further random access response before an expiry of the time window for the random access response.

7. The network device of claim 6, wherein the cell radio network temporary identifier is common to all of the random access channels.

8. The network device of claim 6, wherein identity information of the one or more terminal devices comprises at least one of:

common control channel user equipment identities of the one or more terminal devices, or cell radio network temporary identifier medium access control control elements of the terminal devices.

9. The network device of claim 6, wherein the network device is further caused to:

determine whether a further random access response is needed; and in response to determining that the further random access response is needed, add into the random access response an indication indicating the further random access response.

10. A method, comprising:

transmitting, at a terminal device, a random access request to a network device on a random access channel of a plurality of random access channels, the random access request comprising at least one preamble for a random access procedure and a cell radio network temporary identifier of the terminal device, wherein the cell radio network temporary identifier is common to the plurality of random access channels, wherein the plurality of random access channels are useable by one or more terminal devices to transmit preambles for random access procedures to the network device, and wherein the random access request comprises a message A (MsgA) of a two-step random access;

receiving, from the network device and during a configured time window, a random access response to the random access request on a downlink control channel addressed to the cell radio network temporary identifier; and in response to the receiving, determining that the random access procedure of the terminal device is successful; and in response to the random access response comprising a further indication indicating there is no further random access response to the random access request, stopping monitoring a further random access response before an expiry of the time window for the random access response.

11. The method of claim 10, wherein the cell radio network temporary identifier is common to all of the random access channels.

12. The method of claim 10, wherein transmitting the cell radio network temporary identifier comprises:

in response to the terminal device being in a connected mode, transmitting the cell radio network temporary identifier.

13. The method of claim 10, further comprising:

monitoring the downlink control channel until an expire of a time for the random access response.

14. The method of claim 10, wherein the random access response comprises:

a cell radio network temporary identifier medium access control control element.

15. A computer program embodied on a non-transitory computer readable medium, said computer program comprising instructions which, when executed by at least one processing unit of a machine, cause the machine to perform the method according to claim 10.

* * * * *